Feb. 10, 1925.           1,525,586
G. L. MACHRIS
LIQUID MEASURING AND DISPENSING DEVICE
Filed Aug. 3, 1921    3 Sheets-Sheet 2
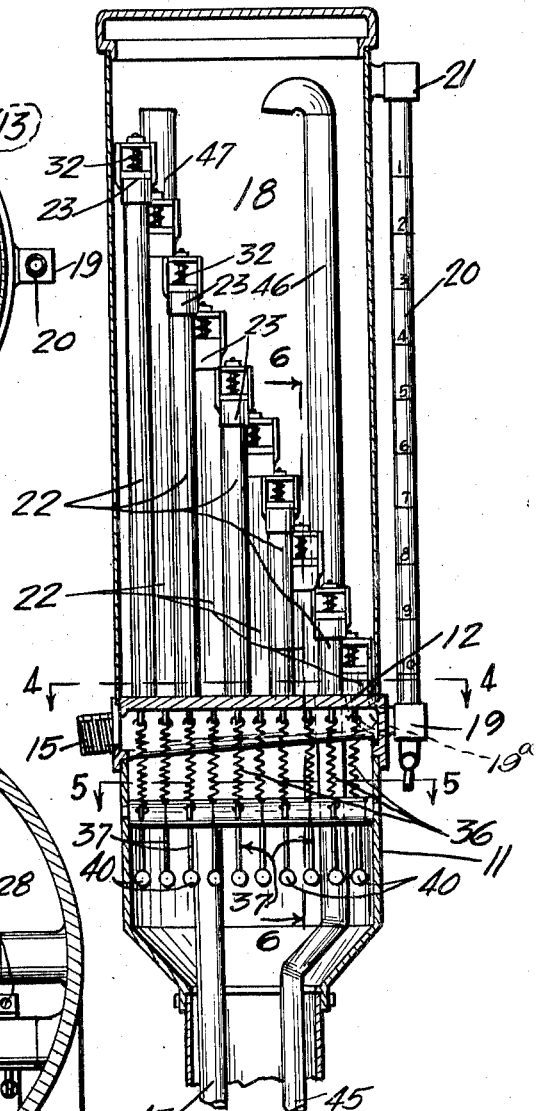
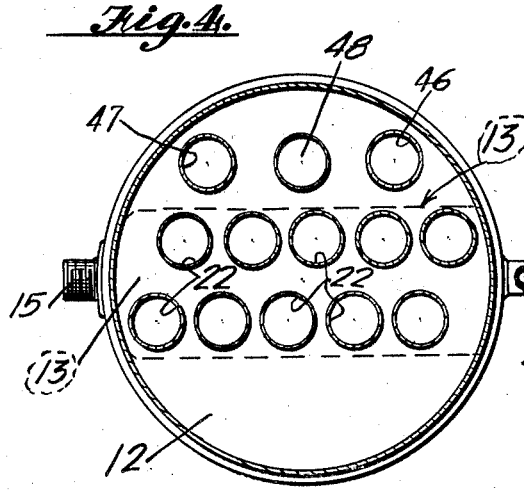
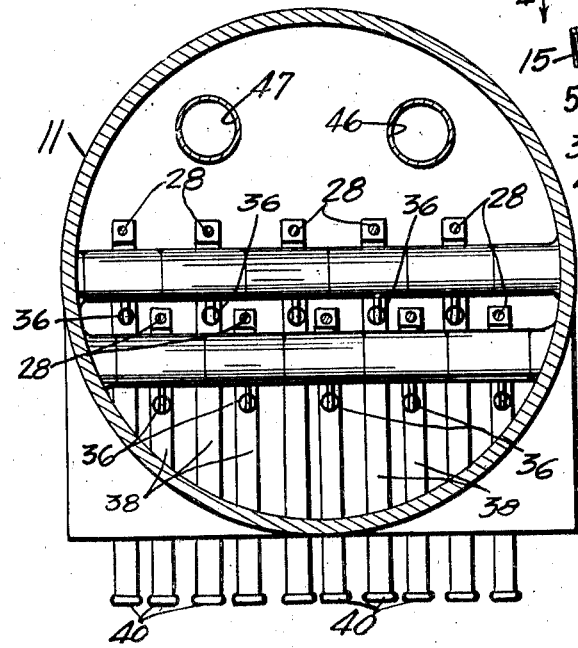
INVENTOR.
George L. Machris
BY
Hazard & Miller
ATTORNEYS.

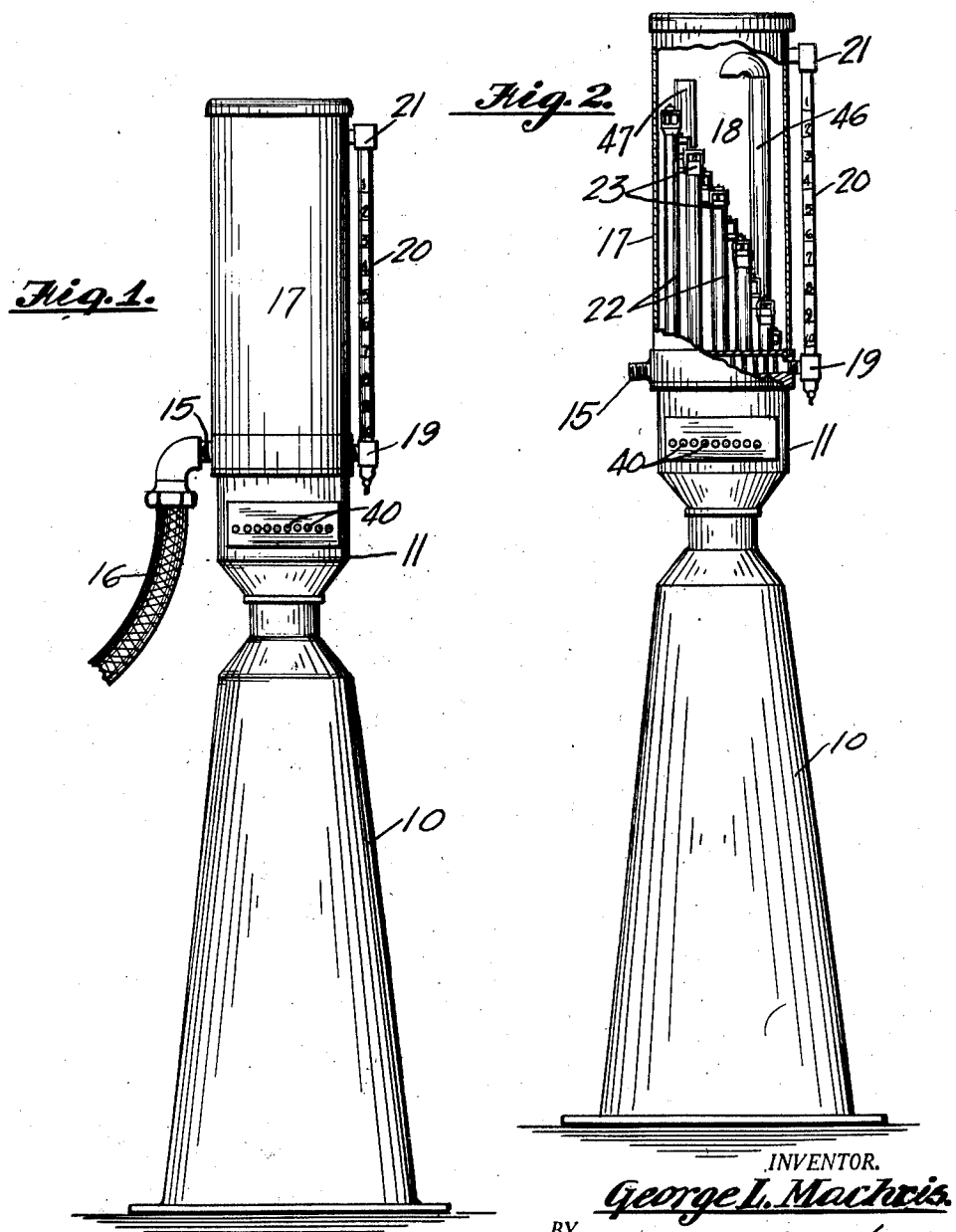

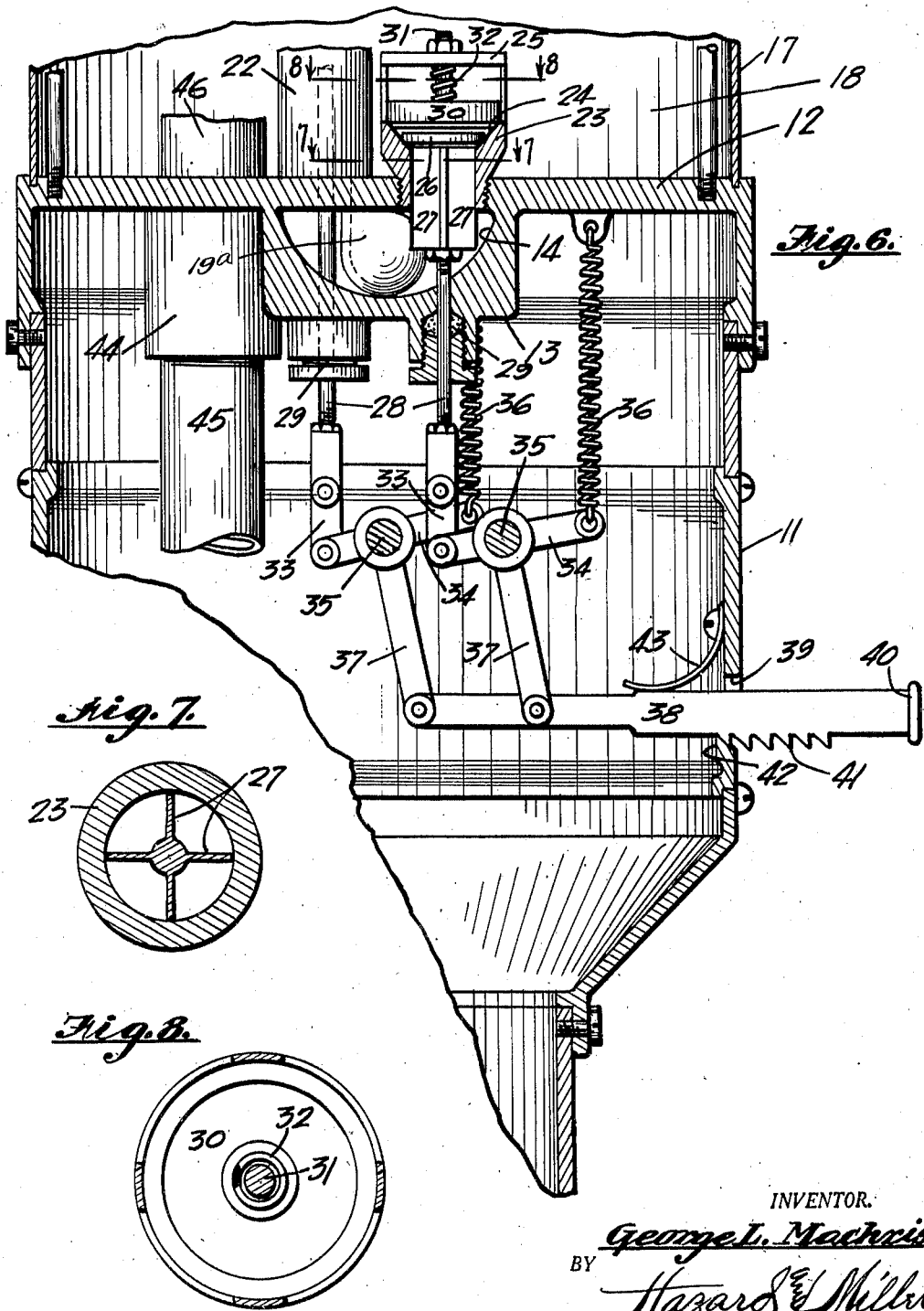

Patented Feb. 10, 1925.

1,525,586

UNITED STATES PATENT OFFICE.

GEORGE L. MACHRIS, OF LOS ANGELES, CALIFORNIA, ASSIGNOR TO WILSHIRE OIL COMPANY, INC., OF LOS ANGELES, CALIFORNIA, A CORPORATION OF CALIFORNIA.

LIQUID MEASURING AND DISPENSING DEVICE.

Application filed August 3, 1921. Serial No. 489,425.

*To all whom it may concern:*

Be it known that I, GEORGE L. MACHRIS, a citizen of the United States, residing at Los Angeles, in the county of Los Angeles and State of California, have invented new and useful Improvements in Liquid Measuring and Dispensing Devices, of which the following is a specification.

My invention relates to a liquid measuring and dispensing device, the principal objects of my invention being to generally improve upon and simplify the construction of the existing forms of similar devices, to provide a relatively simple, compact and efficient device that will be very accurate in the liquid dispensing operations, to provide a construction wherein the purchaser may readily observe the exact amount of liquid dispensed from the device upon his order, and further to provide a liquid measuring and dispensing device that may be easily and cheaply produced, and that will be very effective in performing its intended functions.

The particular type of liquid measuring and dispensing device herein illustrated and described is designed for dispensing gasoline, distillate, kerosene, and other liquid hydrocarbons now generally used in the operation of the internal combustion engines of motor vehicles.

My invention consists in certain novel features of construction and arrangement of parts that will be hereinafter more fully described and claimed and illustrated in the accompanying drawings, in which:

Figure 1 is a side elevational view of a liquid measuring and dispensing device of my improved construction.

Fig. 2 is an elevational view of the device with the liquid container in vertical section.

Fig. 3 is a vertical section taken through the center of the liquid container forming a part of my improved dispensing device.

Fig. 4 is an enlarged horizontal section taken on the line 4—4 of Fig. 3.

Fig. 5 is an enlarged horizontal section taken on the line 5—5 of Fig. 3.

Fig. 6 is an enlarged detail section taken approximately on the line 6—6 of Fig. 3.

Fig. 7 is an enlarged horizontal section taken on the line 7—7 of Fig. 6.

Fig. 8 is an enlarged horizontal section taken on the line 8—8 of Fig. 6.

Referring by numerals to the accompanying drawings which illustrate a practical embodiment of my invention, 10 designates a vertically disposed hollow standard that serves as the base of the apertures, and supported upon the upper end of said base is a relatively short vertically disposed cylindrical housing 11 that contains the greater portion of the valve actuating mechanism of the device, and the top of said housing 11 being closed by a cap plate 12 in the under side of which is formed a housing 13 that extends entirely across the plate, and the chamber 14 within said housing providing a duct or channel through which flows all of the liquid that is dispensed by the device. One end of the housing 13 is provided with an outwardly projecting externally threaded nipple 15 to which is connected one end of a liquid discharge or delivery pipe 16, preferably a section of holes of suitable length. The bottom of the chamber 14 within the housing 13 preferably declines gradually toward the outlet nipples 15 thereby insuring the discharge of all of the liquid that enters said chamber 14.

Positioned on cap plate 12 is a vertically disposed cylinder 17, the upper end of which is closed in any suitable manner, and the chamber 18 within this cylinder is adapted to contain a substantial volume of liquid that is to be dispensed.

As clearly shown in Figure 3, an elbow 19ᵃ is extended through the cap plate 12 and through the end of the housing 13 opposite to that end provided with the nipple 15. This elbow 19ᵃ is, in turn, connected to a similar elbow 19 and the latter, in turn, is connected to the lower end of the glass gauge tube 20. Through the medium of the two elbows it will be clear that the lower end of the tube 20 is in communication with the bottom of the cylinder 17, so that any gasoline introduced into the cylinder will display its level within the tube 20. The upper end of the tube 20 communicates with the upper end of the cylinder 17 through the medium of an elbow 21.

Seated in the cover plate 12 and arranged within the chamber 18 is a series of vertically disposed tubes 22, the lower ends thereof communicating with the discharge duct or channel 14. These tubes are of different lengths so that their upper ends terminate in different predetermined horizontal planes or levels within the chamber 18, and which arrangement is necessary to bring about a discharge of different predetermined volumes of liquid from the chamber 18 when the device is operated.

The upper end of each tube 22 is provided with an annular member 23 that performs the functions of a valve housing, each annular member being provided at its upper end with an inclined or beveled annular valve seat 24, and carried by and extending upwardly from each member 23 is a skeleton frame or cage 25. Normally positioned on the lower portion of the valve seat 24 is a disc valve 26 from which depends a series of radially disposed webs 27, and secured to the lower ends of each set of webs is the upper end of a valve operating rod 28 that passes through a stuffing box or gland 29 on the under side of housing 13. Normally resting on the upper portion of valve seat 24 is a disc valve 30 that is substantially larger in diameter than valve 26, and projecting upwardly from said valve 30, through the upper portion of cage 25 is a stem 31 that carries a compression spring 32, and which latter is effective in normally retaining the valve 30 upon its seat.

Pivotally connected to the lower end of each rod 28 is the upper end of a link 33, and pivotally connected to the lower end of each link 33 is one end of a lever 34 that is journaled on a horizontally disposed rod 35, and which latter has its ends seated in the side wall of housing 11. Secured to the end of lever 34 opposite the end that is pivotally connected to link 33 is the lower end of a retractile spring 36, the upper end thereof being secured to the under side of cover plate 12. This spring is effective in normally retaining the corresponding valve 26 in closed position upon its seat.

Depending from the intermediate portion of each lever 34 is an arm 37, and pivotally connected to the lower end of each arm is the inner end of a push rod 38 which latter extends through an aperture 39 formed in the wall of housing 11. The outer end of each push rod 38 carries a button 40 that is properly numbered, and formed on the lower edge of the intermediate portion of said push rod 38 is a series of depending teeth 41 that are adapted to be engaged by a single tooth 42 that is formed on the wall of housing 11 beneath the opening 39 therein. Bearing on top of each push rod 38 is a spring 43 that is fixed to housing 11, and which is for the purpose of maintaining the teeth 41 on the under side of the push rod in engagement with the tooth 42 when said push rod is moved inwardly to open the corresponding valve.

Depending from plate 12 to the rear of the series of tubes 22 is an internally threaded nipple 44 to which is connected a liquid supply pipe 45 that leads from a suitable source of liquid supply, and suitable means may be associated with said supply pipe for forcing liquid from the source of supply through said pipe and into chamber 18. Secured to the upper end of nipple 44 is the lower end of a vertically disposed inlet pipe 46 that leads upwardly through chamber 18 and terminates at a point near the top thereof. Positioned within chamber 18 is an overflow pipe 47, the upper end thereof terminating in a predetermined plane or level above the uppermost one of the outlet or discharge valves, and said overflow pipe extends through cover plate 12, and from thence downward through standard 10, and said overflow pipe leads to a suitable receptacle or back to the source of liquid supply to which inlet pipe 45 is connected.

Seated in a suitably located opening in cover plate 12 is a drain plug 48, and which latter when removed will permit the relatively small body of liquid within the lower portion of chamber 18 and below the level of the lowermost valve to discharge and drain from said chamber.

The operation of my improved liquid measuring and dispensing device is as follows:

The valve or means associated with inlet pipe 45 is operated to permit liquid to enter chamber 18 through supply pipe 45 and inlet pipe 46. The amount of volume of liquid normally contained within the chamber 18 is determined by the height of overflow tube 47, the upper end of which tube occupies a predetermined plane above the uppermost one of the outlet valves, and where the device is utilized for dispensing gasoline, or the like, and which is usually sold by the gallon, it is desirable that the distance between the upper end of overflow pipe 47 and the upper end of the lowermost valve, or the one on the longest tube 22, represent one liquid gallon, and likewise that the distance between the succeeding lower valves represent liquid gallons. Thus it may be assumed that when the container 18 is filled with liquid or to the top of overflow pipe 47, there is a volume of ten gallons of liquid between the upper end of overflow pipe 47 and the level or plane occupied by the upper edge of the lowermost valve member 23.

To dispense a certain amount of liquid, for instance, five gallons, the operator presses inwardly on the push rod 38 that is provided with the disc or button marked "5", and such movement actuates corresponding parts 37, 34, 33 and 28 to elevate the corresponding valve 26, and immediately after the latter valve leaves its seat, it engages the under side of the corresponding valve 30 and elevates the same from its seat against the resistance offered by the corresponding spring 32. As the valves are thus lifted the volume of liquid above the actuated valve is free to flow downwardly through the open valve and the corresponding tube 22, and said liquid flows into and through the chamber 14, and from thence into and through discharge or delivery tube 16. The degree of opening movement imparted to the valves 26 and 30 may be very accurately controlled by proper manipulation of the push rod 38, and which latter is latched at different points in its inward movement by the engagement of the teeth 41 with fixed tooth 42. Thus the flow of dispensed liquid through the delivery pipe 16 may be very accurately regulated.

The amount of liquid dispensed from the cylinder 17 is clearly displayed to the purchaser by means of the gauge tube 20. As the tube is in communication with the chamber 18, it will be clear that when the chamber is filled with liquid the tube is also filled. Therefore, as the dispensed liquid discharges through chamber 14 and delivery pipe 16, the level of the liquid will gradually and correspondingly lower within the gauge tube, and thus show to the attendant or salesman and the purchaser the actual amount of liquid that is being dispensed and discharged from the apparatus.

Obviously, when the level of the volume of liquid within the chamber 18 reaches the upper edge of the annular member 23 from which the valves were elevated, the flow of liquid from the chamber will stop, and to permit the previously opened valves to return to their seats, the operator merely elevates the outer end of the previously actuated push rod to disengage the teeth thereof from fixed tube 42, and which action will permit the parts to return to their normal position under the influence of the corresponding springs 32 and 36.

It will be noted that two valves are utilized for normally closing the upper end of each discharge tube 22, and this is done in order to minimize leakage of liquid from the chamber 18.

In this connection it will be understood that liquid hydrocarbons, such as gasoline, distillate, kerosene, and the like, are prone to leak through joints and fittings that will ordinarily hold water or similar liquids, and in devices of the character to which my invention relates it is highly desirable to eliminate, in so far as possible, the leakage of the liquids handled by the device.

Thus it will be seen that I have provided a relatively simple, practical, and efficient device for measuring and dispensing liquids, and which device is very compact, capable of being easily operated, and very accurate in the measurements of the dispensed liquids.

It will be understood that minor changes in size, form and construction of the various parts of my improved liquid measuring and dispensing device may be made and substituted for those herein shown and described without departing from the spirit of my invention, the scope of which is set forth in the appended claims.

I claim as my invention:

1. In a liquid measuring and dispensing device, a chamber adapted to contain liquid, a plurality of tubes arranged within said chamber, the lower portions of which tubes communicate with a common outlet, the upper ends of said tubes terminating in different predetermined levels, each tube being provided with an annular member having an annular interior inclined seating surface, a pair of cooperating valves for controlling the flow of liquid through each tube, said valves being adapted to seat upon said interior inclined surface, means for urging said valves to closed position, and means for opening one of said valves thereby causing the other of said valves to be simultaneously opened.

2. In a liquid measuring and dispensing device, a liquid container, a chamber for receiving the liquid from the container, a plurality of tubes arranged within the container and communicating at their lower ends with the chamber, valve seats formed in the upper ends of the tubes, a set of valves normally urged downwardly onto said seats, a second set of valves below the first valve and adapted to respose on said seats, and means for actuating the second set of valves whereby an actuation of the first set of valves is also effected, comprising shafts, levers mounted for rocking movement on the shafts, links operatively connecting the levers with the stems of the second set of valves, arms operatively connected to the levers, push rods operatively connected to the arms for effecting rocking movement of the levers to cause actuation of said valves, and springs associated with the levers for normally maintaining the valves in closed position.

3. In a liquid measuring and dispensing device, a casing having openings formed therein, a liquid container, a chamber for receiving the liquid from the container, a plurality of tubes arranged within the container and communicating at their lower ends with the chamber, valve seats formed in the upper ends of the tubes, a set of valves normally urged downwardly onto said seats, a second set of valves below the first set of valves and adapted to repose on said seats, and means for actuating the second set of valves whereby an actuation of the first set of valves is also effected, comprising shafts, levers mounted for rocking movement on the shafts, links operatively connecting the levers with the stems of the second set of valves, arms operatively connected to the levers, push rods operatively connected to the arms for effecting rocking movement of the lever to cause actuation of said valves, said push rods being movable through the openings of said casing, teeth formed on the push rods and adapted to engage the walls of the openings, and springs engageable with the push rods for normally maintaining the teeth in engagement with the walls, for the purpose described.

4. In a liquid measuring and dispensing device, a liquid container, a chamber for receiving the liquid from the container, a plurality of tubes arranged within the container and communicating at their lower ends with the chamber, valve seats formed in the upper ends of the tubes, a set of valves normally urged downwardly onto said seats, a second set of valves below the first valve and adapted to repose on said seats, and means for actuating the second set of valves whereby an actuation of the first set of valves is also effected, comprising rockable means operatively connected to the stems of the first set of valves, means for normally urging the last means to a position in which the valves are closed, manually operable means operatively connected to the rockable means for actuating the latter, and means for latching the manually operable means in various positions to cause all of said valves to occupy corresponding positions, for the purpose described.

5. In a liquid measuring and dispensing device, a casing having openings formed therein, a liquid container, a chamber for receiving the liquid from the container, a plurality of tubes arranged within the container and communicating at their lower ends with the chamber, a pair of valve seats formed in the upper ends of each of the tubes, a set of valves normally urged downwardly onto the uppermost of said seats, a second set of valves below the first set of valves and adapted to repose on their respective seats, and means for actuating the second set of valves whereby an actuation of the first set of valves is also effected.

In testimony whereof I have signed my name to this specification.

GEORGE L. MACHRIS.